(12) United States Patent
Lin

(10) Patent No.: US 7,889,522 B2
(45) Date of Patent: Feb. 15, 2011

(54) FLYBACK SWITCHING POWER SUPPLY AND CONTROL METHOD THEREOF

(75) Inventor: Chien-Liang Lin, Hsin-Chu (TW)

(73) Assignee: Leadtrend Technology Corp., Science-Based Industrial Park, Hsin-Chu (TW)

( * ) Notice: Subject to any disclaimer, the term of this patent is extended or adjusted under 35 U.S.C. 154(b) by 0 days.

(21) Appl. No.: 12/328,751

(22) Filed: Dec. 4, 2008

(65) Prior Publication Data

US 2010/0142232 A1 Jun. 10, 2010

(51) Int. Cl.
*H02M 7/155* (2006.01)
*H02M 7/23* (2006.01)
*H02M 7/25* (2006.01)

(52) U.S. Cl. .................................. 363/21.16; 363/97
(58) Field of Classification Search .............. 363/21.12, 363/21.13, 21.15, 21.16, 21.17, 21.18, 97, 363/131
See application file for complete search history.

(56) References Cited

U.S. PATENT DOCUMENTS

| | | | | |
|---|---|---|---|---|
| 4,623,960 A | * | 11/1986 | Eng | 363/21.08 |
| 4,755,922 A | * | 7/1988 | Puvogel | 363/21.16 |
| 6,130,826 A | * | 10/2000 | Matsumoto | 363/21.15 |
| 7,239,531 B2 | * | 7/2007 | Oh | 363/21.02 |

* cited by examiner

*Primary Examiner*—Gary L Laxton
*Assistant Examiner*—Nusrat J Quddus
(74) *Attorney, Agent, or Firm*—Winston Hsu; Scott Margo

(57) ABSTRACT

A flyback switching power supply capable of regulating an operation frequency based on a current regulation mechanism is disclosed. The flyback switching power supply includes a transformer, a switch, a switch control circuit, and a regulation circuit. The transformer includes a primary winding for receiving an input voltage, a secondary winding for generating an output voltage, and an auxiliary winding. The switch is serially connected to the primary winding for controlling a current flowing through the primary winding. The switch control circuit has a frequency control port and functions to work around an operation frequency for controlling the switch. The operation frequency is under control by a frequency setting current flowing through the frequency control port. The regulation circuit is electrically coupled between the auxiliary winding and the frequency control port. The regulation circuit adjusts the frequency setting current based on an induced current generated by the auxiliary winding.

14 Claims, 5 Drawing Sheets

FLYBACK SWITCHING POWER SUPPLY AND CONTROL METHOD THEREOF

BACKGROUND OF THE INVENTION

1. Field of the Invention

The present invention relates to a flyback switching power supply and control method thereof, and more particularly, to a flyback switching power supply and related control method capable of regulating an operation frequency based on a current regulation mechanism.

2. Description of the Prior Art

Along with well-known advantages of high efficiency, low power consumption, small size and light weight, the flyback switching power supply has been widely employed as a power converter in various electronic products. Please refer to FIG. 1, which is a schematic diagram showing a prior-art flyback switching power supply 100. Rectifier 102 and filter capacitor 105 are put in use for performing rectification and filter operations on an alternating input voltage Vac, provided by alternating power supply 101, so as to generate an input voltage Vin furnished to transformer 120. Transformer 120 comprises a primary winding 121 for receiving input voltage Vin, a secondary winding 122 for generating a preliminary output voltage, and an auxiliary winding 123. Rectify/filter circuit 170 is utilized for performing rectification and filter operations on the preliminary output voltage for generating an output voltage forwarded to load 195 and feedback circuit 140. Feedback circuit 140 functions to convert the output signal into a feedback signal furnished backwards to switch control circuit 130.

Power generation circuit 190 is used to generate a power voltage Vcc for powering switch control circuit 130 based on an induced current generated by auxiliary winding 123. In general, the operation frequency of control signal Sc is mainly adjusted by switch control circuit 130 based on a frequency setting current If flowing through the current setting resistor Rx externally connected. However, the operation frequency is normally preset to be a fixed value in that the current setting resistor Rx is mostly set to be a fixed resistor as shown in FIG. 1.

SUMMARY OF THE INVENTION

In accordance with an embodiment of the present invention, a flyback switching power supply is provided. The flyback switching power supply comprises a transformer, a switch, a switch control circuit, and a regulation circuit. The transformer comprises a primary winding for receiving an input voltage, a secondary winding for generating an output voltage, and an auxiliary winding. The switch is electrically coupled to the primary winding in series and functions to control a current flowing through the primary winding. The switch control circuit comprises a frequency control port. The switch control circuit is working around an operation frequency for controlling the switch. The operation frequency is controlled by a frequency setting current flowing through the frequency control port. The regulation circuit is electrically coupled between the auxiliary winding and the frequency control port and functions to adjust the frequency setting current based on an induced current generated by the auxiliary winding.

The present invention further provides a control method adaptive for use in a flyback switching power supply. The flyback switching power supply comprises a transformer and a switch control circuit. The transformer comprises a primary winding for receiving an input voltage, a secondary winding for generating an output voltage, and an auxiliary winding for generating an induced voltage. The switch control circuit comprises a frequency control port. The switch control circuit is working around an operation frequency for controlling a current flowing through the primary winding. The operation frequency is controlled by a frequency setting current flowing through the frequency control port. The control method comprises firstly adjusting the frequency setting current according to an induced current generated by the auxiliary winding and then regulating the operation frequency based on the frequency setting current adjusted.

These and other objectives of the present invention will no doubt become obvious to those of ordinary skill in the art after reading the following detailed description of the preferred embodiment that is illustrated in the various figures and drawings.

DETAILED DESCRIPTION

Hereinafter, preferred embodiments of the present invention will be described in detail with reference to the accompanying drawings. Here, it is to be noted that the present invention is not limited thereto.

Figure 1:
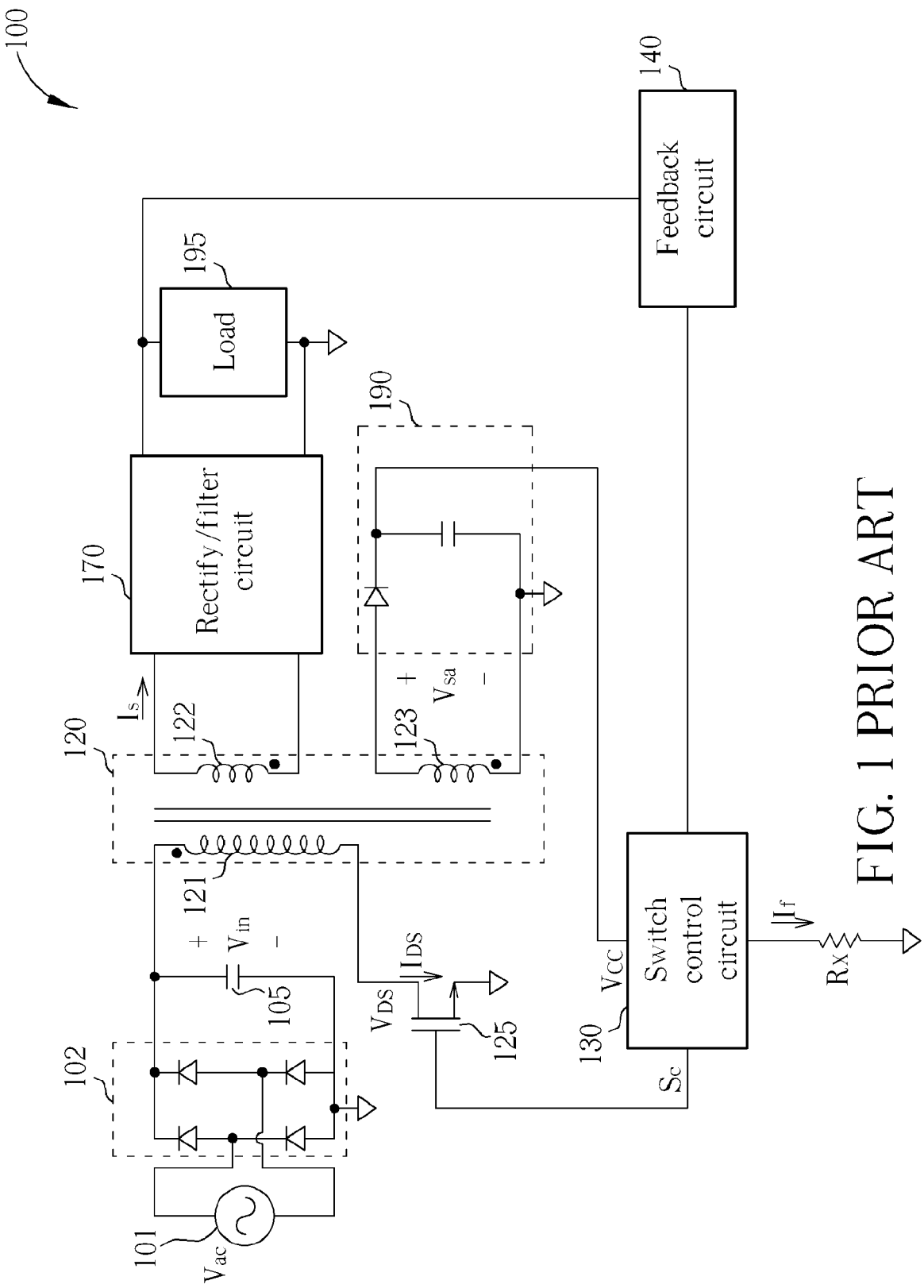
FIG. 1 is a schematic diagram showing a prior-art flyback switching power supply.
Figure 2:
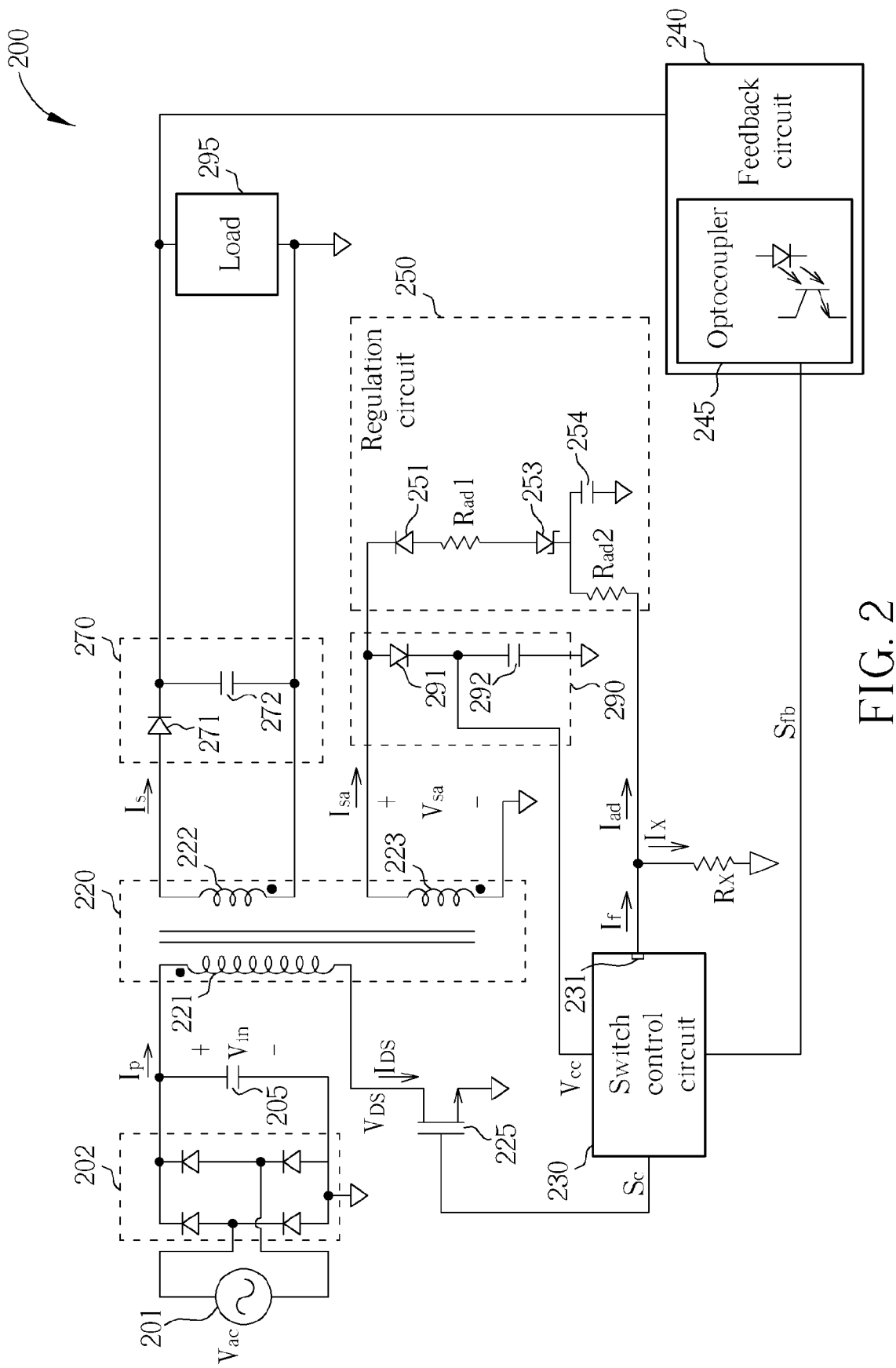
FIG. 2 is a flyback switching power supply in accordance with an embodiment of the present invention.

FIG. 2 is a flyback switching power supply in accordance with an embodiment of the present invention. As shown in FIG. 2, flyback switching power supply 200 comprises a rectifier 202, a filter capacitor 205, a transformer 220, a switch 225, a rectify/filter circuit 270, a feedback circuit 240, a regulation circuit 250, a power generation circuit 290, and a switch control circuit 230. Transformer 220 comprises a primary winding 221, a secondary winding 222 and an auxiliary winding 223. Compared with the prior-art flyback switching power supply 100, flyback switching power supply 200 further comprises regulation unit 250 electrically coupled between auxiliary winding 223 and switch control circuit 230. As is well known to those skilled in the art, the functionalities and/or structures of the rectifier 202, the filter capacitor 205, the transformer 220, the switch 225, the rectify/filter circuit 270, the feedback circuit 240, the power generation circuit 290 and the switch control circuit 230 in FIG. 2 can be similar, equivalent, or identical to those of the rectifier 102, the filter capacitor 105, the transformer 120, the switch 125, the rectify/filter circuit 170, the feedback circuit 140, the power generation circuit 190 and the switch control circuit 130 in FIG. 1.

In the embodiment shown in FIG. 2, feedback circuit 240 comprises an optocoupler 245. Accordingly, the feedback signal Sfb is sent backwards to switch control circuit 230 by means of an optical couple interface for providing an electrical isolation between the input side and the output side of flyback switching power supply 200.

Switch control circuit 230 in FIG. 2 comprises a frequency control port 231. The operation frequency of control signal Sc is under control by a frequency setting current If flowing through frequency control port 231. Current setting resistor Rx is electrically coupled between frequency control port 231 and a ground for providing a default current Ix almost fixed.

Regulation circuit 250 is electrically coupled between auxiliary winding 223 and frequency control port 231 and functions to provide an adjustment current Iad based on an induced current Isa generated by auxiliary winding 223. As shown in FIG. 2, frequency setting current If is actually a sum current of default current Ix and adjustment current Iad. In other words, adjustment current Iad is employed to adjust frequency setting current If; in turn, frequency setting current If is used to regulate the operation frequency of control signal Sc. Regulation circuit 250 comprises a diode 251, an adjustment resistor Rad1, a zener diode 253, a capacitor 254, and an adjustment resistor Rad2. As shown in FIG. 2, diode 251, adjustment resistor Rad1 and zener diode 253 are electrically coupled to form a serial circuit, i.e. the positions of components disposed in the serial circuit are interchangeable without affecting related circuit operations. Low-pass filter, such as capacitor 254, is electrically coupled between the serial circuit and the ground for performing a low-pass filter operation. Adjustment resistor Rad2 is electrically coupled between frequency control port 231 and capacitor 254 for controlling the magnitude of adjustment current Iad. Consequently, the resistance ratio of adjustment resistor Rad2 to current setting resistor Rx can be assigned so that regulation circuit 250 is capable of regulating the operation frequency in a desirable range.

When switch 225 is turned on, due to the rectification operation of diode 251, frequency setting current If can be adjusted only in a process during which induced voltage Vsa is a negative voltage. The zener breakdown voltage of zener diode 253 is employed to set a negative threshold voltage Vth. As induced voltage Vsa generated by auxiliary winding 223 is less than the negative threshold voltage Vth, diode 251 is forward-biased and zener diode 253 is operating in the reverse breakdown region, and adjustment current Iad having a desired magnitude can be generated according to the filter and current regulation operations of capacitor 254, adjustment resistor Rad1 and adjustment resistor Rad2. In turn, frequency setting current If is adjusted by adjustment current Iad for regulating the operation frequency of control signal Sc. Besides, an occurrence of iron core saturation regarding transformer 220, caused by an unacceptable low operation frequency, can be avoided in that the operation frequency of control signal Sc is set to be higher than a lowest acceptable frequency based on the impedance of current setting resistor Rx. On the other hand, the highest operation frequency of control signal Sc might be determined by the parallel impedance of adjustment resistor Rad2 and current setting resistor Rx.

Figure 3:
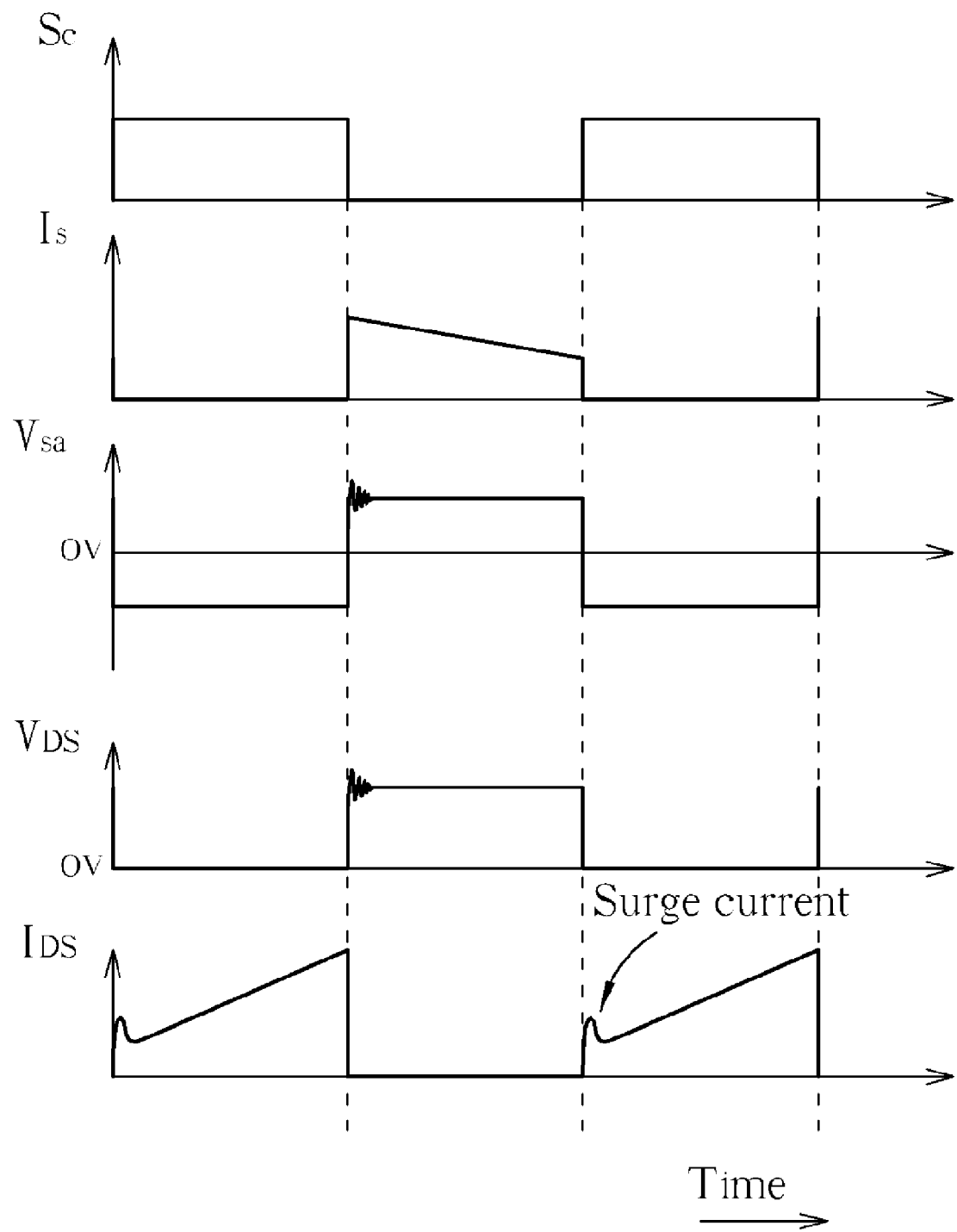
FIG. 3 is a schematic diagram showing the related signal waveforms regarding the continuous conduction operation of the flyback switching power supply in FIG. 2, having time along the abscissa.

FIG. 3 is a schematic diagram showing the related signal waveforms regarding the continuous conduction operation of flyback switching power supply 200 in FIG. 2, having time along the abscissa. The signal waveforms in FIG. 3, from top to bottom, are control signal Sc, the secondary current Is of secondary winding 222, the induced voltage Vsa of auxiliary winding 223, the switch voltage drop $V_{DS}$ of switch 225, and the switch current $I_{DS}$ of switch 225. Please refer to FIG. 3 together with FIG. 2, when switch 225 is turned off by control signal Sc having a low-level voltage, switch current $I_{DS}$ is substantially equal to zero; meanwhile, induced voltage Vsa is retained to be around a first positive voltage, switch voltage drop $V_{DS}$ is retained to be around a second positive voltage, and secondary current Is decreases gradually over time. When induced voltage Vsa is around the first positive voltage, capacitor 292 is charged for powering switch control circuit 230. Alternatively, when switch 225 is turned on by control signal Sc having a high-level voltage, the second positive voltage of switch voltage drop $V_{DS}$ will first cause a surge current of switch current $I_{DS}$; thereafter, switch voltage drop $V_{DS}$ shifts down to almost zero, and switch current $I_{DS}$ drops off to a first current and then increases gradually from the first current to a second current following an increase of primary current Ip flowing through primary winding 221; meanwhile, induced voltage Vsa is retained to be around a negative voltage, and secondary current Is is almost zero due to the reverse-biased operation of diode 271. As shown in FIG. 3, in the continuous conduction operation of flyback switching power supply 200, the switching power consumption caused by the surge current is not significant compared with the power consumption caused in a process during which switch current $I_{DS}$ flowing through switch 225 increases from the first current to the second current.

Figure 4:
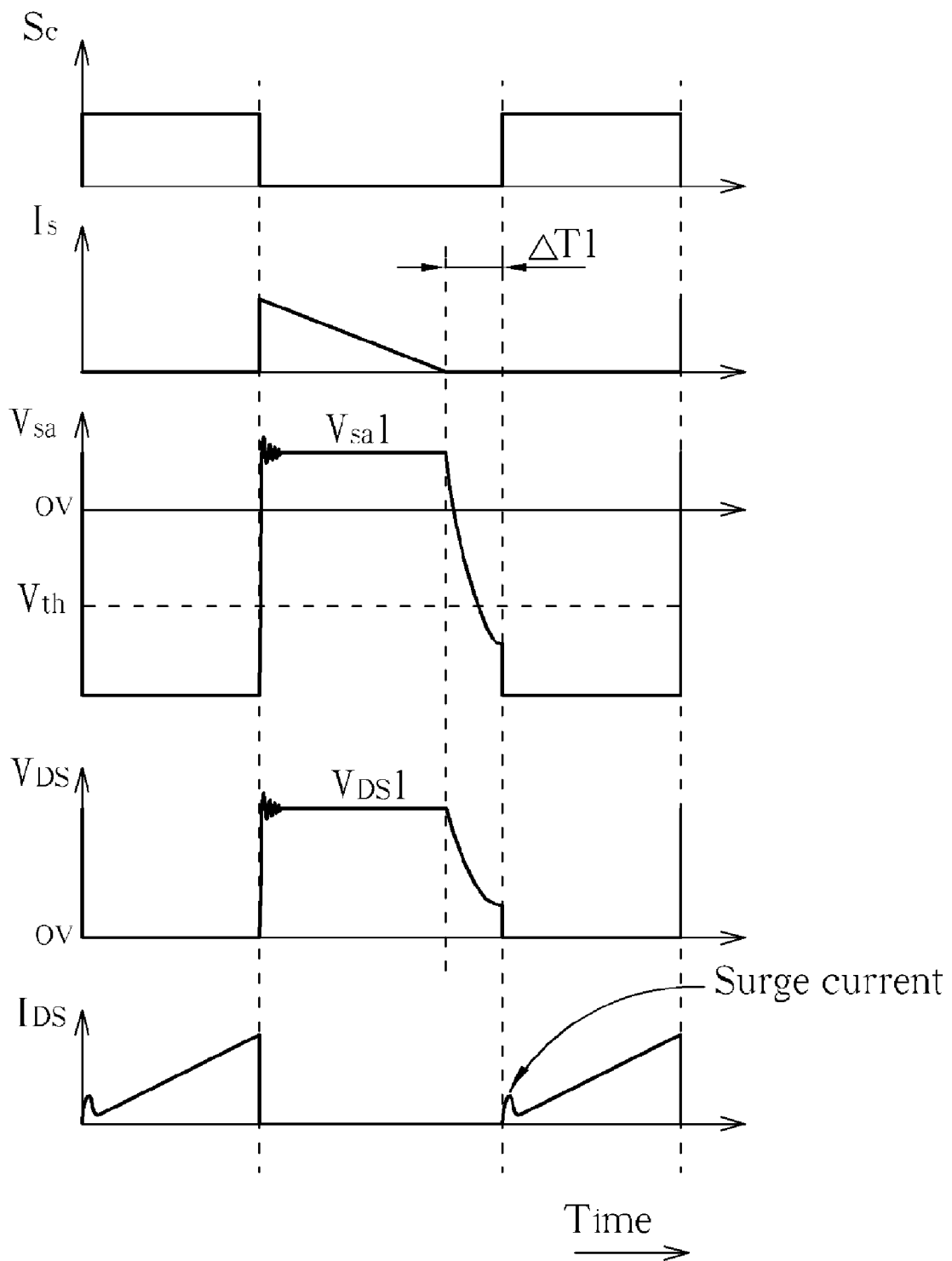
FIG. 4 is a schematic diagram showing the related signal waveforms regarding the discontinuous conduction operation of the flyback switching power supply in FIG. 2, having time along the abscissa.

FIG. 4 is a schematic diagram showing the related signal waveforms regarding the discontinuous conduction operation of the flyback switching power supply 200 in FIG. 2, having time along the abscissa. Please refer to FIG. 4 together with FIG. 2, after switch 225 is turned off by control signal Sc having a low-level voltage, switch current $I_{DS}$ is almost zero; meanwhile, induced voltage Vsa is firstly retained to be around a voltage Vsa1, switch voltage drop $V_{DS}$ is firstly retained to be around a voltage $V_{DS}1$, and secondary current Is decreases gradually from a high current to zero. After secondary current Is decreases to zero, secondary current Is holds zero current during an interval $\Delta T1$. During interval $\Delta T1$, induced voltage Vsa and switch voltage drop $V_{DS}$ are oscillating due to an occurrence of resonance. In a first oscillating period, both induced voltage Vsa and switch voltage drop $V_{DS}$ will first shift down with a sharp slope. When induced voltage Vsa shifts down to a voltage lower than the negative threshold voltage Vth, diode 251 is forward-biased and zener diode 253 is operating in the reverse breakdown region so that regulation circuit 250 is able to increase adjustment current Iad to some extent; in turn, frequency setting current If is raised to some extent following an increase of adjustment current Iad. As induced voltage Vsa is shifting lower, the operation frequency is adjusted to be higher, and the timing of switching control signal Sc from the low-level voltage to the high-level voltage is advanced more. In general, the device parameters such as the resistances of the resistors in regulation circuit 250 can be properly devised so that the timing of turning on switch 225 is advanced to a moment at which switch voltage drop $V_{DS}$ is oscillating to around a wave trough of the first oscillating period as shown in FIG. 4. That is, the switching of switch 225 from off-state to on-state occurs while switch voltage drop $V_{DS}$ is oscillating to about the lowest voltage. Accordingly, the power consumption regarding the switching operation of switch 225 can be reduced significantly in that the surge current is lower as switch voltage drop $V_{DS}$ is lower at a moment prior to turning on switch 225.

Figure 5:
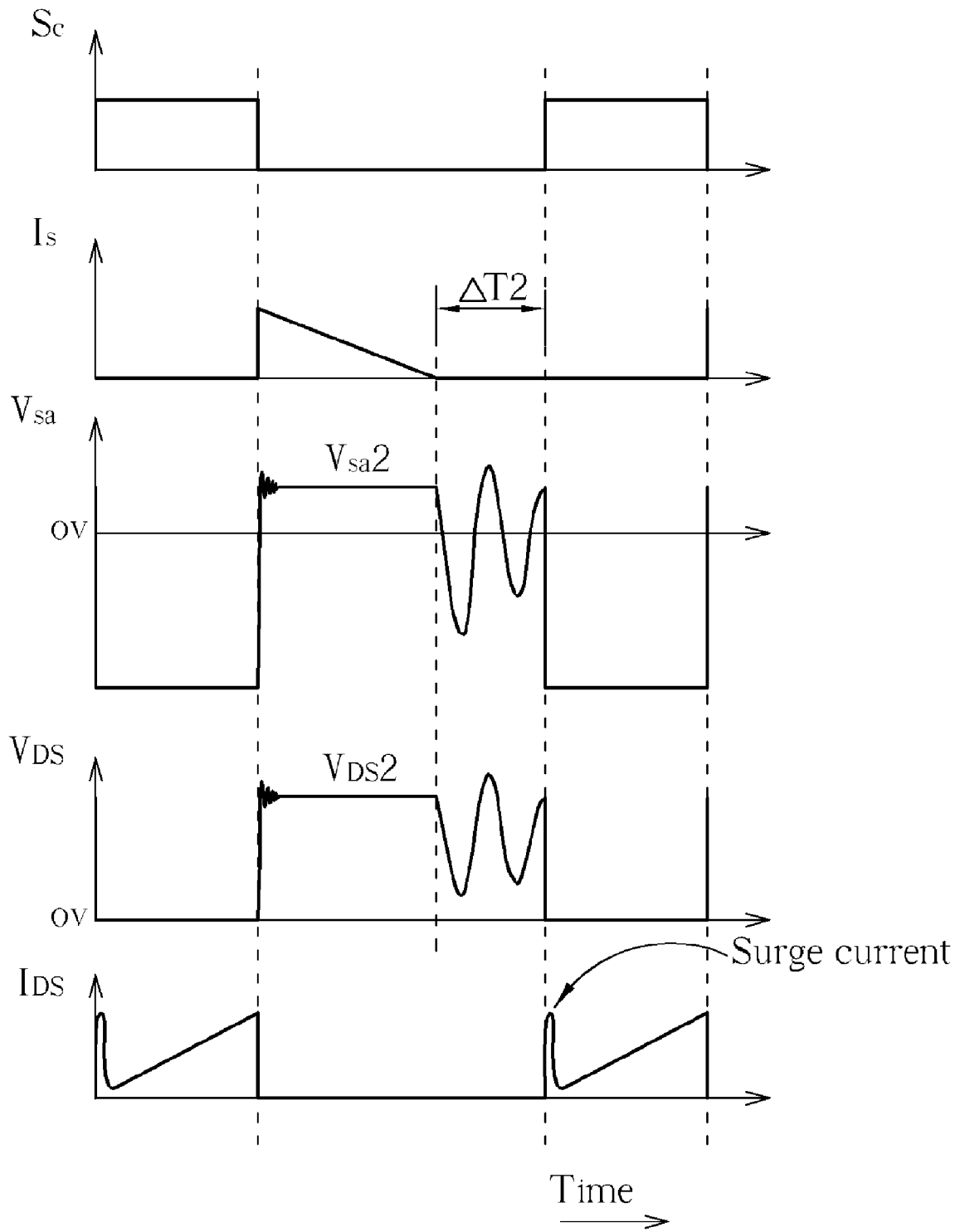
FIG. 5 is a schematic diagram showing the related signal waveforms regarding the discontinuous conduction operation of the flyback switching power supply in FIG. 1, having time along the abscissa.

FIG. 5 is a schematic diagram showing the related signal waveforms regarding the discontinuous conduction operation of the flyback switching power supply 100 in FIG. 1, having time along the abscissa. The signal waveforms in FIG. 5, from top to bottom, are control signal Sc, the secondary current Is of secondary winding 122, the induced voltage Vsa of auxiliary winding 123, the switch voltage drop $V_{DS}$ of switch 125, and the switch current $I_{DS}$ of switch 125.

Please refer to FIG. 5 together with FIG. 1, after switch 125 is turned off by control signal Sc having a low-level voltage, switch current $I_{DS}$ is almost zero; meanwhile, induced voltage Vsa is firstly retained to be around a voltage Vsa2, switch voltage drop $V_{DS}$ is firstly retained to be around a voltage $V_{DS}2$, and secondary current Is decreases gradually from a high current to zero. After secondary current Is decreases to zero, secondary current Is holds zero current during an interval ΔT2. During interval ΔT2, induced voltage Vsa and switch voltage drop $V_{DS}$ are oscillating due to an occurrence of resonance. In the operation of flyback switching power supply 100, the operation frequency of control signal Sc provided by switch control circuit 130 is almost fixed. For that reason, as shown in FIG. 5, the switching of control signal Sc from the low-level voltage to the high-level voltage is likely to occur while switch voltage drop $V_{DS}$ is oscillating to around a wave crest. That is, the switching of switch 125 from off-state to on-state occurs while switch voltage drop $V_{DS}$ is oscillating to a high-level voltage. Since the surge current is higher as switch voltage drop $V_{DS}$ is higher at a moment prior to turning on switch 125, the power consumption regarding the switching operation of switch 125 is then higher accordingly.

In summary, compared with the prior-art flyback switching power supply 100, the flyback switching power supply 200 of the present invention is able to dynamically adjust the timing of switching the switch 225 from off-state to on-state so that the timing of switching the switch 225 from off-state to on-state can be set to a moment at which the switch voltage drop $V_{DS}$ is oscillating to around a wave trough, for reducing the switching power consumption.

In the embodiment shown in FIG. 2, if induced voltage Vsa is oscillating and the magnitude of input voltage Vin is high enough for incurring a high oscillating amplitude of induced voltage Vsa, regulation circuit 250 is then enabled to generate adjustment current Iad for reducing the switching power consumption as induced voltage Vsa is oscillating to be a negative voltage less than the negative threshold voltage Vth determined by the zener breakdown voltage of zener diode 253. Alternatively, if input voltage Vin is not high enough, regulation circuit 250 may not be enabled to generate adjustment current Iad for reducing the switching power consumption in that the switching power consumption is not significant under such situation. Zener diode 253 plays a role determining whether regulation circuit 250 reacts in respect to the magnitude of input voltage Vin. In another embodiment, the zener diode 253 of flyback switching power supply 200 is omitted, and regulation circuit 250 is enabled for reducing the switching power consumption as long as the flyback switching power supply 200 is operating in the discontinuous conduction mode regardless of the magnitude of input voltage Vin.

Referring to the waveforms shown in FIG. 4, when switch 225 is turned on, induced voltage Vsa is also less than the negative threshold voltage Vth; therefore, regulation circuit 250 is enabled as well to generate adjustment current Iad for performing a frequency compensation operation by adjusting frequency setting current If. Capacitor 254 together with adjustment resistor Rad1 functions as a low-pass filter. Once the turn-on interval of switch 225 is too short or the duty cycle of control signal Sc is too small, the amount of adjustment current Iad turns out to be smaller because of the circuit operation of the low-pass filter. On the other hand, if the output is almost at a full-load condition or the duty cycle of control signal Sc is higher, the amount of adjustment current Iad becomes larger for performing a desired significant frequency compensation operation with the aid of capacitor 254 and adjustment resistor Rad1 having device values properly designed. In other words, capacitor 254 and adjustment resistor Rad1 make regulation circuit 250 to react during heavy load and not to react during light load or no load. Please refer to FIG. 2, in another embodiment, capacitor 254 can be removed and adjustment resistor Rad1 can be shorted; therefore the frequency compensation operation, similar or identical to the aforementioned, is performed regardless of the length of the duty cycle of control signal Sc. Also, please continue referring to FIG. 2, in an alternative embodiment, capacitor 254 can be removed and zener diode 253 and adjustment resistor Rad1 can be shorted.

The present invention is by no means limited to the embodiments as described above by referring to the accompanying drawings, which may be modified and altered in a variety of different ways without departing from the scope of the present invention. Thus, it should be understood by those skilled in the art that various modifications, combinations, sub-combinations and alternations might occur depending on design requirements and other factors insofar as they are within the scope of the appended claims or the equivalents thereof.

What is claimed is:

1. A flyback switching power supply, comprising:
   a transformer comprising a primary winding for receiving an input voltage, a secondary winding for generating an output voltage, and an auxiliary winding;
   a switch, electrically coupled to the primary winding in series, for controlling a current flowing through the primary winding;
   a switch control circuit comprising a frequency control port, the switch control circuit being working around an operation frequency for controlling the switch, the operation frequency being controlled by a frequency setting current flowing through the frequency control port;
   a power generation circuit, comprising a filter capacitor and a regular diode connected in series, the regular diode having an anode connected to the auxiliary winding, the filter capacitor having a first terminal coupled to ground and a second terminal coupled to the switch control circuit so as to generate a power voltage provided to the switch control circuit based on an induced current; and
   a regulation circuit, comprising a receiving terminal coupled to the auxiliary winding and the anode of the regular diode and an adjusting terminal coupled to the frequency control port, for adjusting the frequency setting current based on the induced current generated by the auxiliary winding.

2. The flyback switching power supply of claim 1, wherein the auxiliary winding generates an induced voltage and the regulation circuit adjusts the frequency setting current when the induced voltage is less than a negative threshold voltage.

3. The flyback switching power supply of claim 1, further comprising:
   a current setting resistor, electrically coupled between the frequency setting port and a power line, for setting the frequency setting current to be a preset value.

4. The flyback switching power supply of claim 1, wherein the regulation circuit comprises:
   a diode, a first resistor and a zener diode electrically coupled in series, wherein the zener diode and the diode are employed to set a negative threshold voltage and the first resistor is employed to roughly set an adjusting amount of the frequency setting current.

5. The flyback switching power supply of claim 1, wherein the regulation circuit comprises:
   a diode electrically coupled to the auxiliary winding; and
   a low-pass filter electrically coupled between the diode and the frequency control port.

6. The flyback switching power supply of claim 5, wherein the regulation circuit further comprises:
   a first resistor and a zener diode electrically coupled to the diode in series between the auxiliary winding and the low-pass filter.

7. The flyback switching power supply of claim 5, wherein the regulation circuit further comprises:
   a resistor electrically coupled between the frequency control port and the low-pass filter.

8. The flyback switching power supply of claim 5, wherein the low-pass filter comprises:
   a capacitor electrically coupled between the frequency control port and a power line.

9. The flyback switching power supply of claim 1, further comprising:
   a feedback circuit for generating a feedback voltage based on the output voltage, the feedback voltage being furnished to the switch control circuit.

10. A control method adaptive for use in a flyback switching power supply, the flyback switching power supply comprising:
    a transformer comprising a primary winding for receiving an input voltage, a secondary winding for generating an output voltage, and an auxiliary winding for generating an induced voltage; and
    a switch control circuit comprising a frequency control port, the switch control circuit being working around an operation frequency for controlling a current flowing through the primary winding, the operation frequency being controlled by a frequency setting current flowing through the frequency control port;
    the control method comprising:
    detecting the induced voltage so as to generate an induced current with the auxiliary winding;
    adjusting the frequency setting current according to the induced current; and
    regulating the operation frequency based on the frequency setting current adjusted.

11. The control method of claim 10, further comprising:
    controlling the current flowing through the primary winding based on the operation frequency regulated.

12. The control method of claim 10, further comprising:
    powering the switch control circuit by making use of the induced current when the induced voltage is greater than a first preset value.

13. The control method of claim 12, wherein the step of adjusting the frequency setting current according to the induced current generated by the auxiliary winding comprises:
    adjusting the frequency setting current according to the induced current when the induced voltage is less than a second preset value, the second preset value being less than the first preset value.

14. The control method of claim 10, wherein the step of adjusting the frequency setting current according to the induced current generated by the auxiliary winding comprises:
    adjusting the frequency setting current according to the induced current when the induced voltage is a negative voltage.

* * * * *